United States Patent
Collins et al.

(10) Patent No.: US 10,564,314 B2
(45) Date of Patent: Feb. 18, 2020

(54) AUTOMATIC DOOR INSTALLATION AND METHOD OF DETERMINING THE PRESENCE OF AN OBSTACLE

(71) Applicant: Ensota (Guangzhou) Technologies Ltd., Guangzhou (CN)

(72) Inventors: Peter Collins, Cheltenham (GB); John Curzon, Cheltenham (GB)

(73) Assignee: Ensota(Guangzhou) Technologies Ltd., Guangzhou (CN)

( * ) Notice: Subject to any disclaimer, the term of this patent is extended or adjusted under 35 U.S.C. 154(b) by 214 days.

(21) Appl. No.: 15/490,262

(22) Filed: Apr. 18, 2017

(65) Prior Publication Data

US 2017/0315262 A1    Nov. 2, 2017

(30) Foreign Application Priority Data

Apr. 28, 2016   (GB) .................. 1607382.7

(51) Int. Cl.
| | | |
|---|---|---|
| *G01V 8/20* | (2006.01) | |
| *B66B 13/26* | (2006.01) | |
| *E05F 15/43* | (2015.01) | |
| *E05F 15/14* | (2006.01) | |

(52) U.S. Cl.
CPC .............. *G01V 8/20* (2013.01); *B66B 13/26* (2013.01); *E05F 15/143* (2013.01)

(58) Field of Classification Search
CPC .. G01V 8/20; E05F 15/43; E05F 15/74; E05F 2015/765; E05F 2015/437; B66B 13/26
See application file for complete search history.

(56) References Cited

U.S. PATENT DOCUMENTS

| | | |
|---|---|---|
| 3,805,061 A | 4/1974 | De Missimy et al. |
| 4,266,124 A | 5/1981 | Weber et al. |
| 5,149,921 A | 9/1992 | Picado |
| 5,567,931 A | 10/1996 | Amend et al. |

(Continued)

FOREIGN PATENT DOCUMENTS

| | | |
|---|---|---|
| CN | 201102851 Y | 8/2007 |
| CN | 101184686 A | 5/2008 |

(Continued)

OTHER PUBLICATIONS

Search Report issued by British Intellectual Property Office in GB Patent Application No. GB1607382.7 dated Oct. 21, 2016.

(Continued)

*Primary Examiner* — Que Tan Le
*Assistant Examiner* — Jennifer D Bennett
(74) *Attorney, Agent, or Firm* — Gesmer Updegrove LLP

(57) ABSTRACT

There is disclosed an automatic door installation 10 comprising: a door opening 16; and an optical door sensor comprising: a plurality of transmitters 30 arranged in a transmitter array 22, each transmitter 30 being configured to transmit an optical beam across the door opening along a respective beam path; a plurality of receivers 32 arranged in a receiver array 24, each receiver 32 being configured to generate a receiver output signal based on an intensity of light received. The plurality of receivers 32 are arranged in at least one set of receivers, the receivers of the or each set being linked so that the respective sensor output signals are combined into a compound signal for the respective set.

22 Claims, 9 Drawing Sheets

(56) References Cited

U.S. PATENT DOCUMENTS

| | | | |
|---|---|---|---|
| 6,167,991 B1 | 1/2001 | Full et al. | |
| 7,755,024 B2 | 7/2010 | Platt et al. | |
| 2003/0052273 A1* | 3/2003 | Iwasawa | G01V 8/20 250/341.7 |
| 2005/0133702 A1 | 6/2005 | Meyer | |
| 2008/0087798 A1* | 4/2008 | Schmitz | G01V 8/20 250/206.1 |
| 2010/0074622 A1* | 3/2010 | Damink | G01V 8/20 398/78 |

FOREIGN PATENT DOCUMENTS

| | | | | |
|---|---|---|---|---|
| DE | 20200700444 U1 * | 6/2007 | | G01V 8/20 |
| DE | 202007004442 U1 | 6/2007 | | |
| GB | 2420176 A | 5/2006 | | |
| GB | 2526071 A | 11/2015 | | |
| JP | 2005194085 A | 7/2006 | | |

OTHER PUBLICATIONS

Search Report issued by European Patent Office in related European Patent Application No. 17 16 6420 dated Aug. 25, 2017.
Office Action issued by State Intellectual Property Office in related CN Patent Application No. 201710293757.8 dated Sep. 4, 2018.

* cited by examiner

AUTOMATIC DOOR INSTALLATION AND METHOD OF DETERMINING THE PRESENCE OF AN OBSTACLE

PRIORITY INFORMATION

This application claims priority to GB Application No. 1607382.7, filed on Apr. 28, 2016, which is incorporated herein by reference in its entirety.

The invention relates to an optical door sensor, automatic door installation and a method of determining the presence of an obstacle. In particular, the invention relates to a sensor, installation or method in which the presence of an obstacle is determined based on a compound signal relating to a plurality of receivers of a receiver array.

In typical automatic door installations there may be a number of sensors configured to detect obstacles to prevent or halt a door closing operation, or re-open the doors. For example, in elevator installations it is typical to provide a fixed sensor mounted to an elevator car and arranged to project a light curtain (an array of lateral beams) between the elevator car doors and landing car doors. The fixed sensor is configured so that interruption of the light curtain by an obstacle prevents continuation or commencement of a door closing operation. The fixed sensor typically comprises a transmitter array and an opposing receiver array arranged so that each transmitter has a transmitter axis extending horizontally towards a corresponding receiver.

When a beam from a transmitter is not received by the corresponding receiver, the sensor determines that an obstacle is present. The transmitters and receivers are multiplexed so that an output signal from a receiver corresponds to the transmission form the corresponding transmitter only. If an opaque object lies on the path between a transmitter and the corresponding receiver, the direct path of the beam from transmitter to receiver will be blocked. The vertical spacing between the transmitters (and the respective transmitter axes) therefore represents the minimum object dimension that can be determined by the fixed sensor, since smaller objects may lie between the horizontal axes and thereby fail to interrupt a beam.

An elevator installation typically further comprises a moving sensor, or edge sensor, mounted on the moving doors (typically on the opposing faces of the elevator car doors). Moving sensors are similar to fixed sensors, but may be adapted to accommodate the changing light intensity of the beams received at the receivers owing to the changing separation between the transmitter array and the receiver array during door opening and closing operations.

In the field of elevators, the regulatory trend over previous decades has been for the minimum object size that should reliably be resolved by a sensor to decrease, thereby resulting in increasingly complex sensors in automatic door installations.

It is therefore desirable to provide an alternative automatic door installation, optical door sensor and method of determining the presence of an obstacle.

According to a first aspect of the invention there is provided an automatic door installation comprising: a door opening; and an optical door sensor comprising: a plurality of transmitters arranged in a transmitter array, each transmitter being configured to transmit an optical beam across the door opening along a respective beam path; a plurality of receivers arranged in a receiver array, each receiver being configured to generate a receiver output signal based on an intensity of light received; wherein the plurality of receivers are arranged in at least one set of receivers, the receivers of the or each set being linked so that the respective sensor output signals are combined into a compound signal for the respective set; and a processor unit configured to receive the or each compound signal from the at least one set of receivers; wherein each transmitter is arranged so that at least two receivers belonging to the same set of receivers lie on the respective beam path in at least one operational configuration of the automatic door installation; and wherein the processor unit is configured to determine whether an obstacle is present based on the at least one compound signal.

The transmitter array may be a linear array having a linear extent of approximately 0.5 m to approximately 2.5 m.

The automatic door installation may further comprise a transmitter controller configured to control the transmitters to transmit the respective optical beams by time-division multiplexing and/or frequency-division multiplexing so that the respective optical beams are discrete from one another.

For each transmission of an optical beam (i.e. a transmission or series of transmissions from a respective transmitter), the processor unit may be configured to: determine an intensity parameter from the or each respective compound signal relating to the light intensity on the respective linked receivers; determine whether an obstacle is present in the door gap based on the intensity parameter and primary obstacle criteria. The primary obstacle criteria may be set based on an unobstructed intensity parameter relating to an unobstructed transmission of the respective optical beam, so that an obstacle is determined to be present when the intensity parameter is indicative of or corresponds to any reduction of light intensity on the linked receivers greater than a primary threshold reduction. The primary threshold reduction may be between 0.2% and 60% relative an unobstructed transmission.

The automatic door installation may further comprise a database of unobstructed intensity parameters correlated by at least one operational parameter of the automatic door installation, and the processor unit may be configured to lookup the unobstructed intensity parameter for determining whether an obstacle is present based on at least one operational parameter. The at least one operational parameter is selected from the group consisting of: a transmitter parameter for identifying the transmitter which corresponds to the respective transmission of the optical beam; a separation parameter relating to the lateral separation between the transmitter array and the receiver array; a channel parameter for identifying the set of receivers which corresponds to the respective compound signal; and a noise parameter relating to a background noise signal affecting the optical door sensor.

The processor unit may be configured to update the database of unobstructed intensity parameters based on an intensity parameter observed in use when an obstacle is not determined to be present.

The transmitter array and the receiver array may oppose one another across the door gap. At least one of the transmitter array and receiver array may be mounted to a moveable part of the door installation such that the transmitter array and the receiver array draw closer together during a door closing operation.

The unobstructed intensity parameter may be dependent on a separation parameter relating to the lateral separation between the transmitter array and the receiver array in a respective operational configuration of the automatic door installation.

The automatic door installation may comprise a door controller configured to monitor or predict the operational configuration of the door installation, and the processor unit may be coupled to the door controller so as to determine the separation parameter.

The processor unit may be configured to determine the presence of an obstacle based on at least two compound signals corresponding to transmissions from different transmitters and secondary obstacle criteria.

The processor unit may be configured to determine the presence of an obstacle based on at least two intensity parameters corresponding to transmissions from different transmitters. The secondary obstacle criteria may be set based on the respective unobstructed intensity parameters, so that an obstacle is determined to be present when each of the respective intensity parameters are indicative of any reduction of light intensity on the respective linked receivers greater than a respective secondary threshold reduction, and the secondary threshold reduction may be less than the primary threshold reduction for the respective transmission and respective compound signal.

The transmitter controller may be configured to cause each transmitter of the transmitter array to transmit a respective optical beam in a detection cycle. The processor unit may be configured to: determine whether an obstacle is present based on the intensity parameter and primary obstacle criteria for each transmission; and determine whether an obstacle is present based on the intensity parameters for at least two respective transmissions and the respective secondary obstacle criteria when no obstacle is determined to be present based on primary obstacle criteria for any of the transmissions in the detection cycle.

The processor unit may be configured to: determine a first transmission of the detection cycle for which the intensity parameter is indicative of a reduction in light greater than the respective secondary threshold reduction and less than the primary threshold reduction; determine a second transmission of the detection cycle based on the first transmission; determine whether an obstacle is present based on the intensity parameters for the first and second transmissions and the respective secondary obstacle criteria.

The processor unit may be configured to determine the first transmission by identifying which transmission of the detection cycle is associated with an intensity parameter indicative of the greatest reduction in light received relative an unobstructed transmission in the detection cycle.

The automatic door installation may further comprise a secondary obstacle criteria database comprising secondary obstacle criteria for the first and second transmissions. The processor unit may be configured to determine the secondary obstacle criteria for the second transmission based on the first transmission and the second transmission.

All the receivers of the receiver array may be arranged in the same set. Alternatively, the or each set may be a proper subset of the plurality of receivers in the receiver array. A proper subset is intended to mean that all the receivers of the subset belong to the plurality of receivers, but not all of the receivers within the plurality of receivers belong to the subset. That is to say that the subset is smaller than the plurality of receivers. This is the conventional meaning for the mathematical term "proper subset". The receivers of each set may be located side by side with no interposing receivers. Alternatively, receivers from different sets may be interposed with one another in an alternating arrangement.

There is also provided an optical door sensor for an automatic door installation according to the first aspect of the invention.

According to a second aspect of the invention there is provided a method of determining the presence of an obstacle in a door gap of an automatic door installation, the automatic door installation comprising: the door opening; and an optical door sensor comprising: a plurality of transmitters arranged in a transmitter array, each transmitter being configured to transmit an optical beam across the door opening along a respective beam path; a plurality of receivers arranged in a receiver array, each receiver being configured to generate a receiver output signal based on an intensity of light received; wherein the plurality of receivers are arranged in at least one set of the receivers, the receivers of the or each set being linked so that the respective sensor output signals are combined into a compound signal for the respective set; and wherein each transmitter is arranged so that at least two receivers belonging to the same set of receivers lie on the respective beam path in at least one operational configuration of the automatic door installation. The method comprises: causing the transmitters to transmit respective optical beams across the door opening so that the receivers generate corresponding receiver output signals and the or each compound signal; and determining the presence of an obstacle in the door gap based on the at least one compound signal.

The automatic door installation may be in accordance with the first aspect of the invention.

The method may further comprise, for each transmission of an optical beam (i.e. a transmission or series of transmissions from a respective transmitter): determining an intensity parameter from the or each respective compound signal relating to the light intensity on the respective linked receivers. The presence of an obstacle may be determined based on the intensity parameter and primary obstacle criteria; and the primary obstacle criteria may be set based on an unobstructed intensity parameter relating to an unobstructed transmission of the respective optical beam, so that an obstacle is determined to be present when the intensity parameter is indicative of or corresponds to any reduction of light intensity on the linked receivers greater than a primary threshold reduction, wherein the primary threshold reduction is between 0.2% and 60% relative an unobstructed transmission.

The method may further comprise obtaining an unobstructed intensity parameter for determining whether an obstacle is present from a database of unobstructed intensity parameters correlated by at least one operational parameter. The method may further comprise updating the database of unobstructed intensity parameters based on an intensity parameter observed in use when an obstacle is not determined to be present.

The presence of an obstacle may be determined based on at least two compound signals corresponding to transmissions from different transmitters and secondary obstacle criteria. The processor unit may be configured to determine the presence of an obstacle based on at least two intensity parameters corresponding to transmissions from different transmitters; and the secondary obstacle criteria may be set based on the respective unobstructed intensity parameters, so that an obstacle is determined to be present when each of the respective intensity parameters are indicative of any reduction of light intensity on the respective linked receivers greater than a respective secondary threshold reduction, wherein the secondary threshold reduction is less than the primary threshold reduction for the respective transmission and respective compound signal Each transmitter of the transmitter array may transmit a respective optical beam in a detection cycle, and the method may comprise: determining whether an obstacle is present based on the intensity parameter and primary obstacle criteria for each transmission; and determining whether an obstacle is present based on the intensity parameters for at least two respective transmissions and the respective secondary obstacle criteria when no obstacle is determined to be present based on primary obstacle criteria for any of the transmissions in the detection cycle.

The invention will now be described, by way of example, with reference to the following drawings, in which:

FIG. 1 schematically shows an automatic door installation according to the invention;

FIG. 2 schematically shows the automatic door installation of FIG. 1 with an obstacle near a transmitter during a transmission from the respective transmitter;

FIG. 3 schematically shows the automatic door installation of FIG. 1 with an obstacle near a receiver during a transmission from a first transmitter;

FIG. 4 schematically shows the automatic door installation of FIG. 1 with an obstacle near a receiver during a transmission from a second transmitter;

Figure 1:
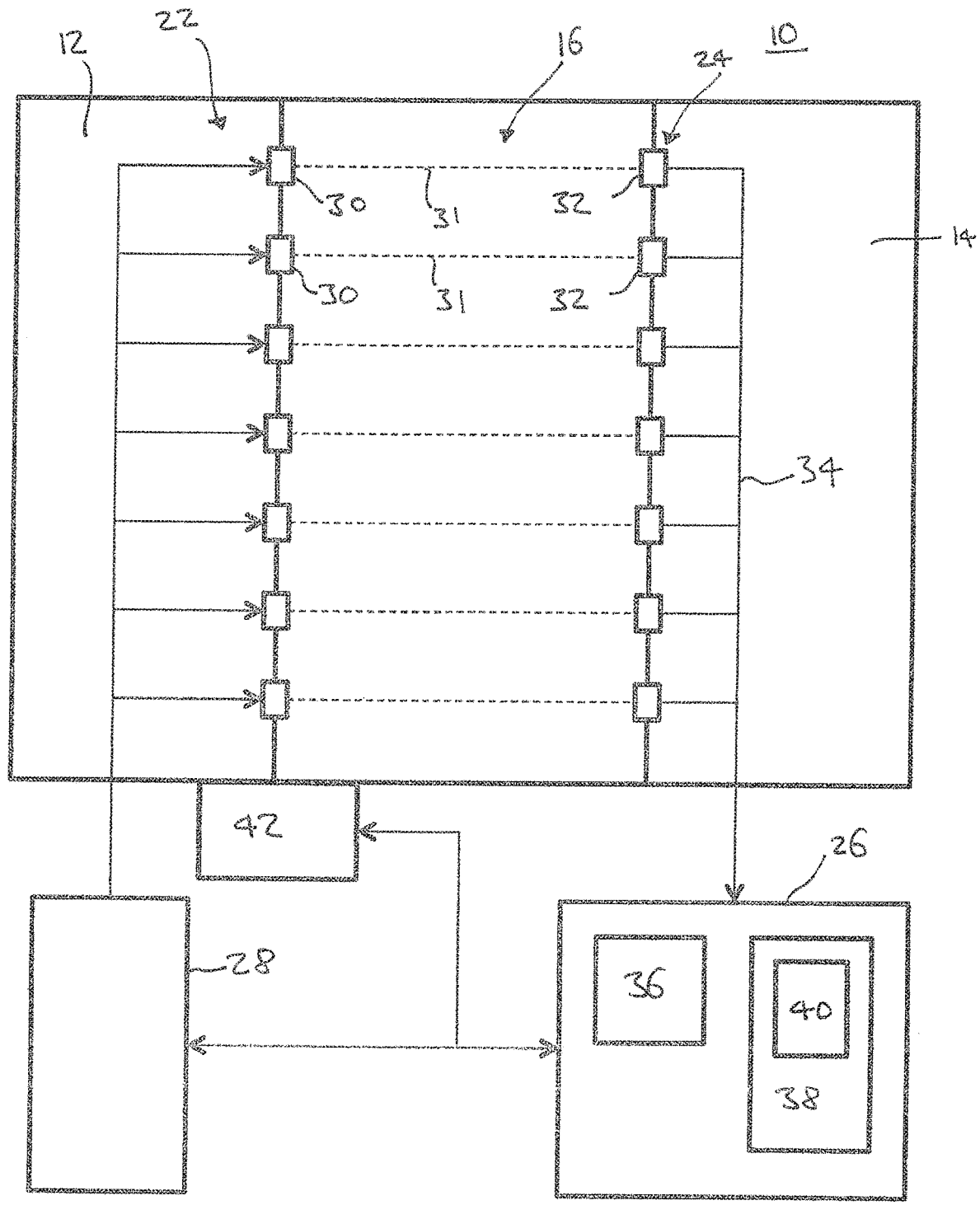

FIG. 1 shows an elevator car 10 of an elevator installation comprising first and second doors 12, 14 opposing one another and configured to move relative one another in door opening and closing operations to open and close a door opening 16 therebetween. The elevator car 10 has a variable door gap 16 having a maximum of 2000 mm between the edges of the doors 12, 14 when the doors 12, 14 are in a fully open configuration.

An optical door sensor is installed in the elevator car 10 and comprises a transmitter array 22 installed on an edge of the first door 12 and a receiver array 24 installed on an opposing edge of the second door 14, together with a processor unit 26 and transmitter controller 28.

The transmitter array 22 comprises a plurality of infrared transmitters 30 longitudinally spaced apart. In this example embodiment there are 37 (thirty-seven) transmitters 30 evenly spaced apart longitudinally along the array 22 at intervals of 50 mm, so that the transmitter array 22 is 1.8 m long, however only seven transmitters are shown in FIG. 1 for drawing clarity. Similarly, the receiver array 24 comprises the same number of infrared receivers 32 evenly longitudinally spaced apart to oppose the transmitters 30. In this embodiment there is the same amount of receivers 32 as transmitters, spaced apart by the same amount and directly opposing the transmitters 30, but in other embodiments there could be fewer or more receivers 32 than transmitters 30 and they may be staggered with respect to the transmitters 30.

In this embodiment, the transmitters 30 are mounted on an array support member which is secured to the door edge. Similarly, the receivers 32 are mounted on an array support member which is secured to the opposing door edge. Accordingly, the transmitters 30 and receivers 32 can be setup and aligned on the respective array support members, which can be easily installed on the door edge (or elsewhere).

The transmitters 30 are configured to transmit infrared optical beams, and the receivers 32 are configured to produce receiver output signals in response to the reception of infrared light (only).

Figure 2:
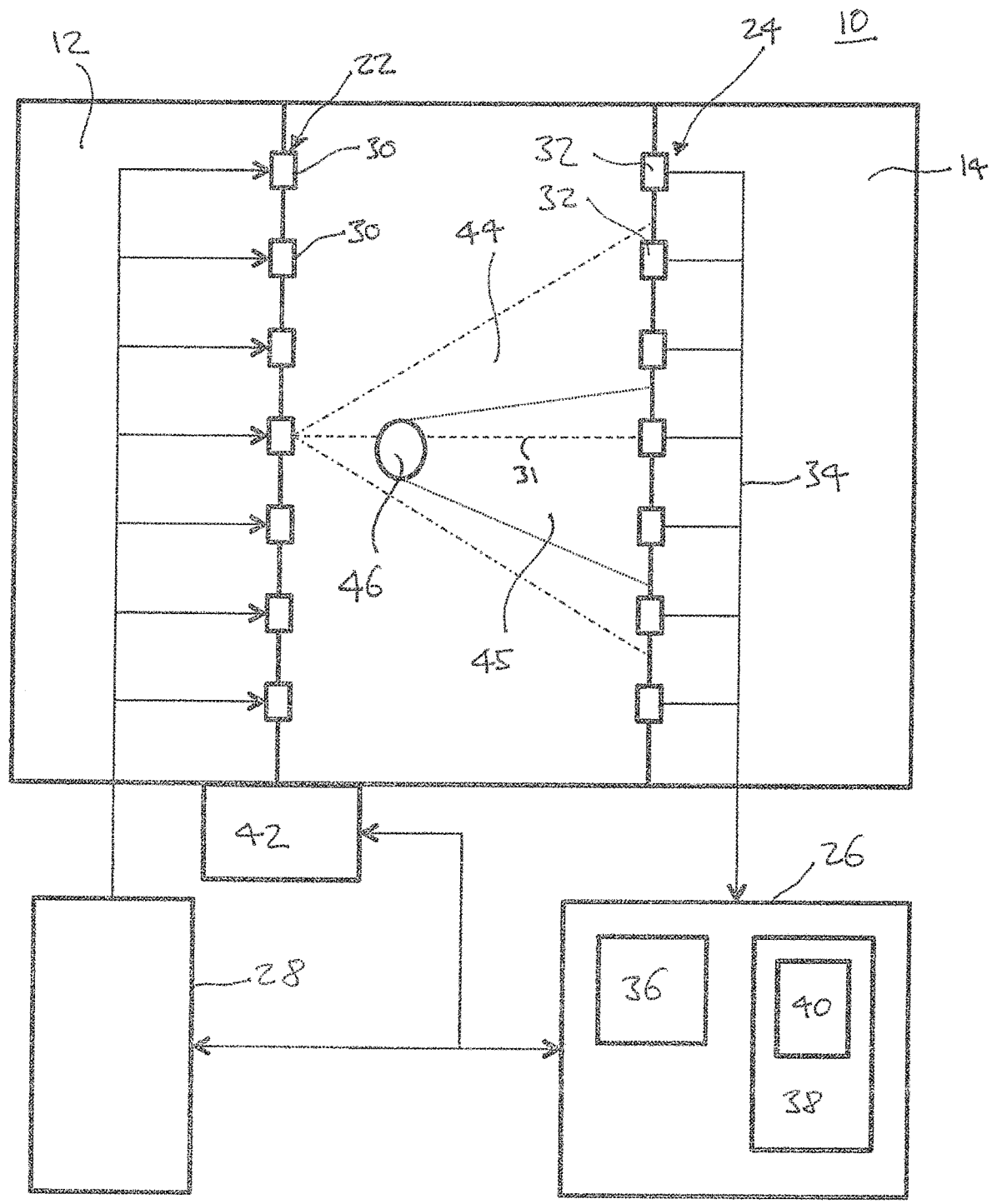
Figure 3:
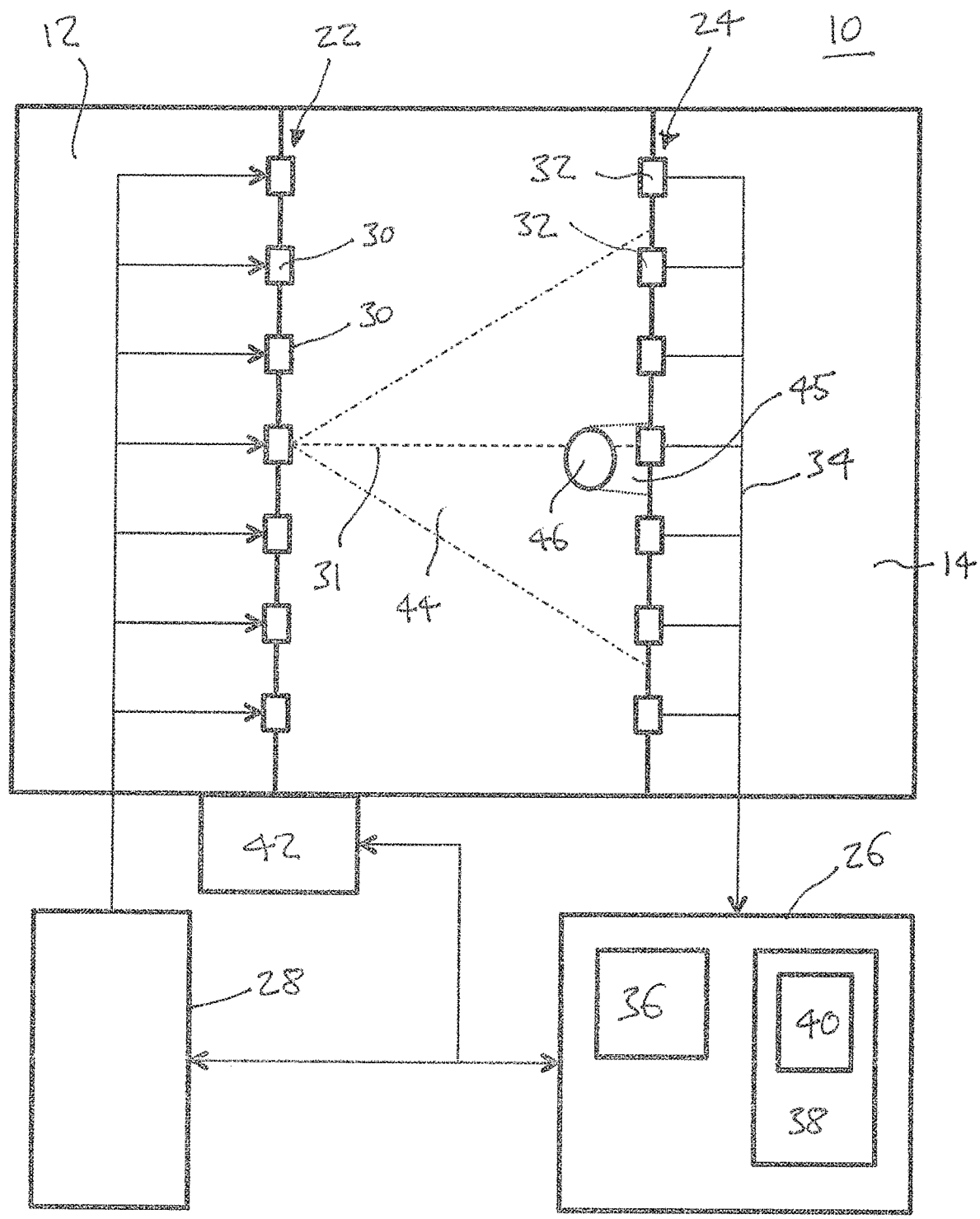
Figure 4:
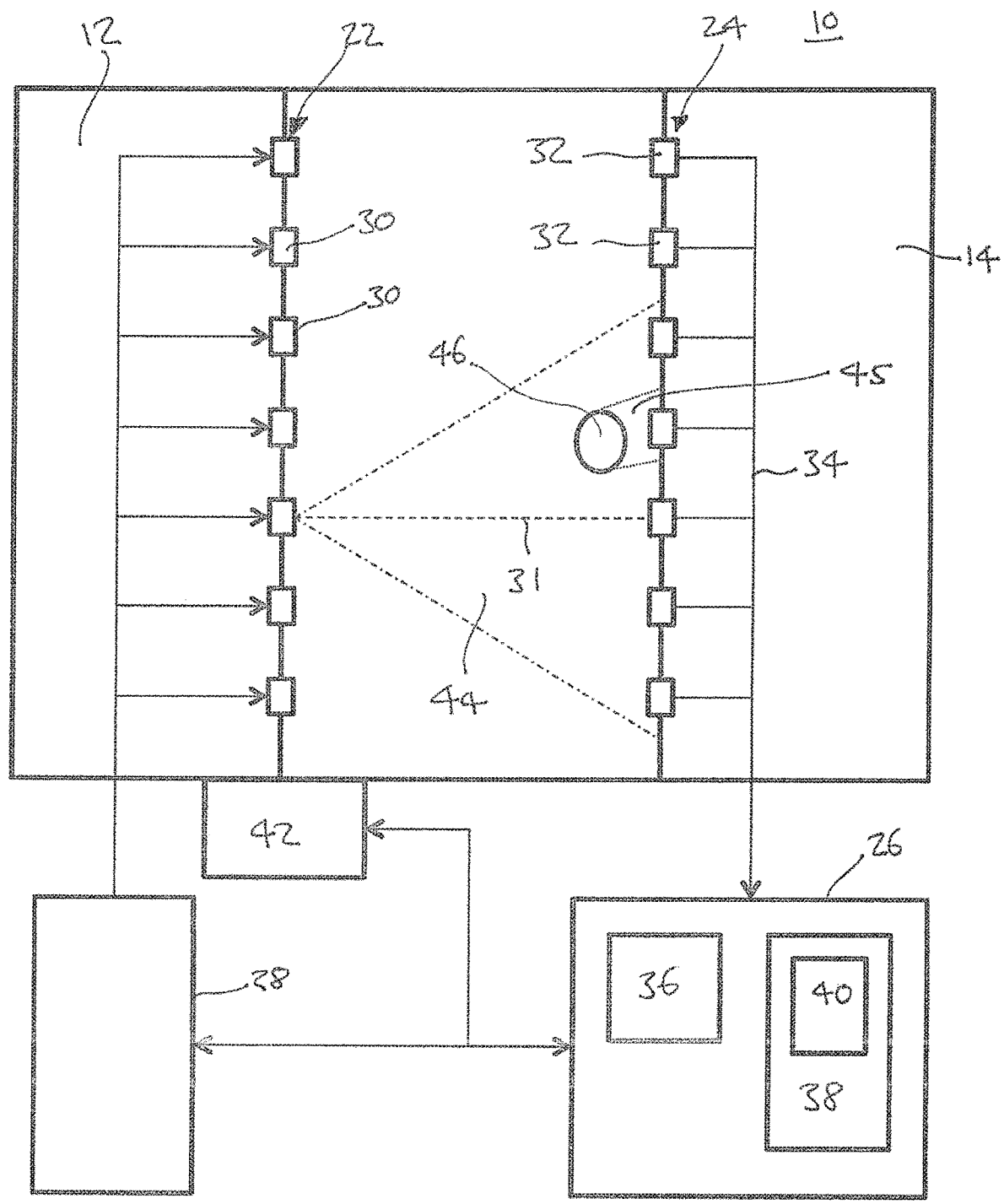

As shown in FIGS. 2-4, each transmitter 30 is configured to transmit an optical beam along a respective beam path 44 centred around a respective beam axis 31. In this embodiment, the beam axes 31 are all substantially horizontal and extend from each transmitter 30 to an opposing receiver 32. Each transmitter 30 is configured so that the beam path 44 is dispersed around the axis 31 (i.e. in a cone) so that the light intensity is highest along the beam axes 31 and reduces at angles away from the axis 31. For example, the light intensity along a direction inclined from the beam axis 31 by 10° may be approximately 85% relative the light intensity along the beam axis 31. The relative intensity may be approximately 60% for an angle of 20°, approximately 30% for an angle of 30° and approximately 10% for an angle of 40°.

The transmitters 30 are individually coupled to the transmitter controller 28 in a multiplexed arrangement, so that the transmitter controller 28 can send control signals to each one of the transmitters 28 individually to cause transmission of the respective beams 44. The transmitter controller 28 is configured to cause the transmitters 30 to transmit the respective beams in sequence, such that the beams themselves are time-division multiplexed. In this embodiment, the transmitter controller 28 is configured to transmit the respective beams in height-descending order from the top of the transmitter array 22 to the bottom, but in other embodiments they may be transmitted in any order.

The receivers 32 are coupled to the processor unit 26 via a common link 34 without multiplexing, such that the receiver output signals output by each respective receiver 32 combine together to form a compound signal relating to the cumulative light intensity received on the plurality of receivers (in the infrared range). Accordingly, it is not possible to separate the compound signal into component parts relating to particular receivers. Since all of the receivers 32 are coupled to the processor by the same common link 34 in this way (i.e. without multiplexing), they are all part of the same set of receivers, which in this embodiment includes all receivers of the array 24.

The processor unit 26 comprises a processor 36, and a memory 38 including a database 40, as will be described in detail below. The processor unit 26 is coupled for communication with the transmitter controller 28. The processor unit 26 is also coupled with a drive controller 42 for controlling the opening and closing of the elevator car doors. The drive controller 42 is configured to generate a displacement signal corresponding to the displacement of the doors from a closed position, using an integral displacement sensor, such as a rotary encoder attached to a drive unit (e.g. a motor) of the drive controller.

The processor unit 26 is configured to determine whether an obstacle is present in the door opening 16 based on the compound signal received from the plurality of linked receivers 32. As will be described in detail below, the processor unit is configured to determine whether an obstacle is present based on primary obstacle criteria or secondary obstacle criteria. The primary obstacle criteria are set for determining the presence of an obstacle based on a single transmission from a respective transmitter. The secondary obstacle criteria are set for determining the presence of an obstacle based on multiple transmissions. The secondary obstacle criteria is intended to provide additional confidence that a signal is indicative that an obstacle is present when the compound signal provides limited resolution, as will be described in detail below.

The primary and secondary obstacle criteria are set based on the principle that the amount of light received cumulatively by the linked receivers will reduce when an obstacle is present, even though one or more of the linked receivers may still receive light from the respective beam.

In a simplified example obstacle detection scenario shown in FIG. 2, an obstacle 46 is located approximately one third of the separation between the transmitter array 22 and the receiver array 24 so that the beam path 44 along the beam axis 31 from the central transmitter is blocked by the axis. The beam path is dispersed around the beam axis 31 so that, in the operational configuration of the door as shown in FIG. 2 (which is fully open), a plurality of receivers 32 lie on the beam path (five as shown in the simplified drawing). However, the obstacle 46 blocks a portion of the beam path 45 corresponding to some of the receivers (two receivers in the simplified drawing). Accordingly, the light intensity received by the linked receivers is reduced relative an unobstructed transmission. In this example, the light intensity received is reduced by approximately 30%. This is greater than the proportion of receivers that are blocked because the blocked portion of the beam path 45 is relatively close to the beam axis 31 where the light intensity is relatively stronger and the beam path length is shorter. There is an inverse square relationship between path length and light intensity. Accordingly, an obstacle can be determined to be present based on the reduction in light intensity received.

In a further simplified example obstacle detection scenario shown in FIG. 3, the same obstacle 46 is located closer to the receiver array 24 so that fewer receivers 32 are blocked by the obstacle 46 (only the one receiver directly opposite the active transmitter 30 in the simplified drawing). Accordingly, the light intensity received by the linked receivers is reduced by a lower amount: approximately 15% in this example (relative an unobstructed transmission).

It may be more difficult to determine lower reductions in light intensity, particularly where background noise is prevalent or the light signal is weak or subject to interference. However, a secondary check may be performed to determine whether the light intensity received by the linked receivers for other transmissions (i.e. from a different transmitter) is similarly reduced. FIG. 4 shows the same obstacle detection scenario as in FIG. 3, except the next transmitter (one below the central position) is active. In this example, the light intensity blocked by the obstacle 46 is slightly less than in FIG. 3, since the blocked portion of the path 45 is more inclined relative the transmitter axis 31, and the path length of the blocked portion of the path is longer. Accordingly, the light intensity received by the linked receivers may be reduced by between 12-13%. Transmissions from other transmitters 30 may also result in reductions in the light intensity received by the linked receivers 32, relative an unobstructed transmission.

The secondary obstacle criteria can be set so that relatively small reductions in light intensity are only deemed to be indicative of an obstacle in the door gap when at least two transmissions demonstrate the same trend, as will be described in detail below. Relatively small reductions in light intensity may occur when the obstacle is small and only blocks one or a small number of receivers, is semi-transparent, when the intensity of the beam is weak or the door gap is relatively large.

In this embodiment, the receiver array 28 comprises a variable-gain amplifier and a 3 volt (3V) 12 bit analog to digital converter (ADC), which is capable of outputting the compound signal over 4096 increments. The applicant has found that typical sensor and power supply systems suffer from a background noise signal corresponding to approximately 3 of the 4096 increments. It is desirable to ensure that any variation in a signal which may be indicative of the presence of an obstacle is clearly distinguished above a noise signal. Accordingly, the primary and secondary obstacle criteria are set so that an obstacle is only determined to be present based on a reduction in the compound signal from the linked receivers relative an unobstructed transmission which corresponds to a predetermined multiple of the background level of noise, as will be described in detail below.

The database 40 stores unobstructed intensity parameters for transmissions from each transmitter 30 correlated to a range of door positions. In particular, the database 40 correlates the unobstructed intensity parameters according to both transmitter ID (i.e. from 1 to 37 downwards) and a separation parameter corresponding to the lateral separation between the transmitter array 22 and the receiver array 24.

In use, the processor unit 26 determines the separation parameter based on a displacement signal received from the drive unit 42. Further, the processor unit 26 determines to which transmitter ID a portion of the compound signal corresponds, based on the time-division multiplexing of the transmitters 30. In particular, the processor unit 26 is coupled to the transmitter controller 28 and configured to correlate the compound signal with the sequence in which the transmitters 30 are operated. Accordingly, the processor unit 26 is able to lookup an unobstructed intensity parameter for a given separation parameter and transmitter ID for the purposes of evaluating the primary and/or secondary obstacle criteria.

Methods of determining the presence of an obstacle based on the primary obstacle criteria and secondary obstacle criteria will now be described, by way of example and with reference to the elevator car 10 described above.

Figure 5:
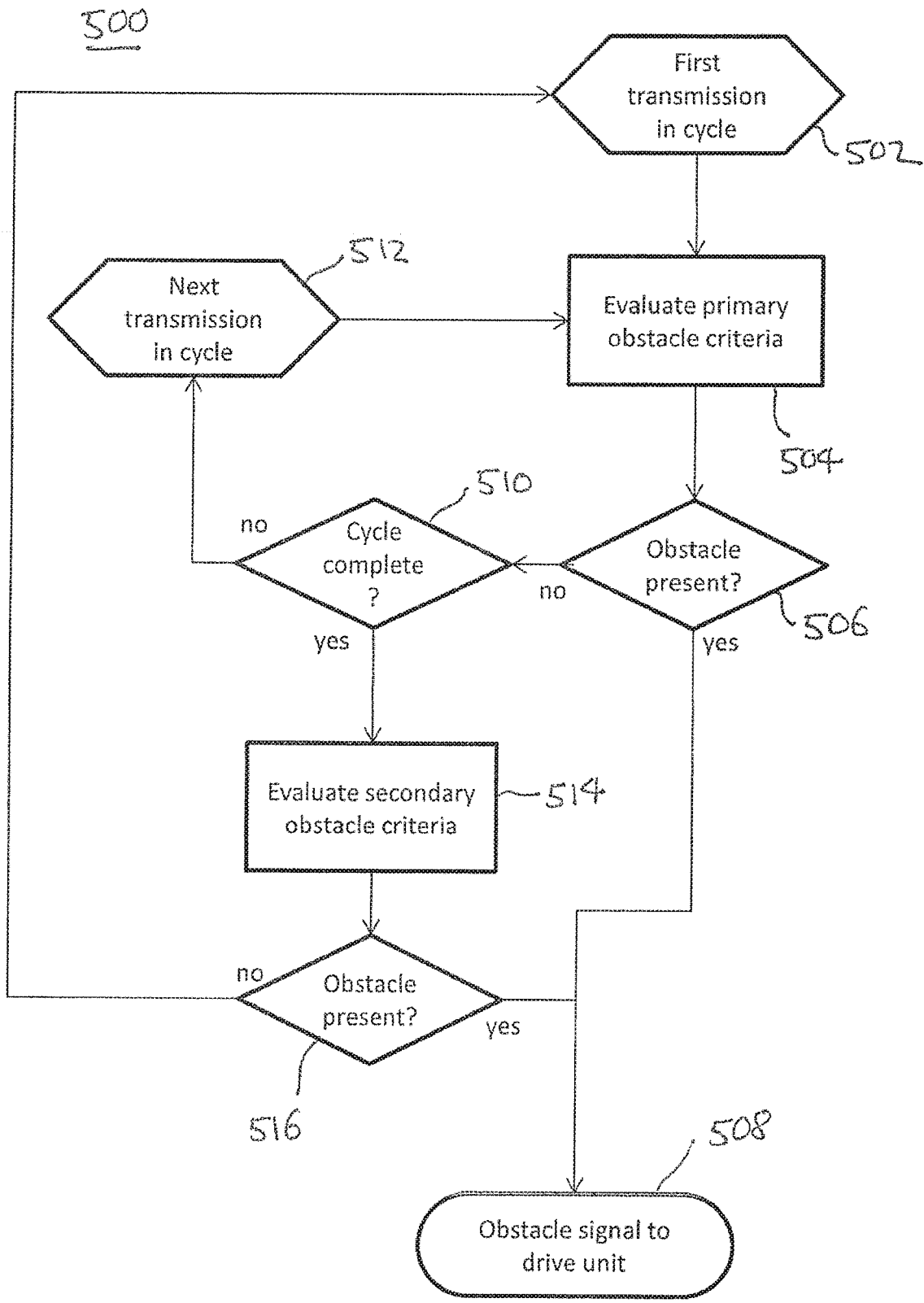
FIG. 5 illustrates a method of determining the presence of an obstacle.

A method (500) of determining the presence of an obstacle is shown in FIG. 5. The processor unit 26 initiates a detection cycle by causing the transmitter controller 28 to control each transmitter 22 in turn to transmit a respective optical beam 44. Starting with the first transmission in the cycle (502), the processor unit 26 evaluates the primary obstacle criteria (504) based on the corresponding signal from the linked receivers 32, as will be described in detail below. Based on the evaluation of the primary obstacle criteria, the processor unit determines whether an obstacle is present (506). If a positive determination can be made, the processor unit 26 transmits an obstacle signal to the drive unit 42. The drive unit 42 determines whether to prevent, stop and/or reverse a door closing operation based on the obstacle signal. Otherwise, if no positive determination is made, the processor unit checks whether detection cycle is complete (510). If the detection cycle is not complete, the processor repeats the evaluation of the primary obstacle criteria for the next transmission in the cycle (512).

If no obstacle is determined to be present based on the primary evaluation criteria for any of the transmissions in the detection cycle, the processor unit 26 proceeds to evaluate the secondary evaluation criteria (514), as will be described in detail below.

If an obstacle is determined to be present (516) based on the secondary obstacle criteria, the processor unit 26 transmits an obstacle signal to the drive unit. Otherwise, if no obstacle is determined to be present, the next detection cycle is initiated by the processor unit 26 and the method (500) is repeated.

In the example embodiments, a detection cycle is completed every 60 ms and successive transmissions take place at 0.5 ms intervals.

The steps for evaluating the primary obstacle criteria (504) in the above example method will now be described with reference to an obstacle detection example in which an obstacle is disposed near to the central receiver 32 of the receiver array 24 (receiver ID 19) when the doors are only separated by 100 mm (i.e. a door gap of 100 mm).

Figure 6:
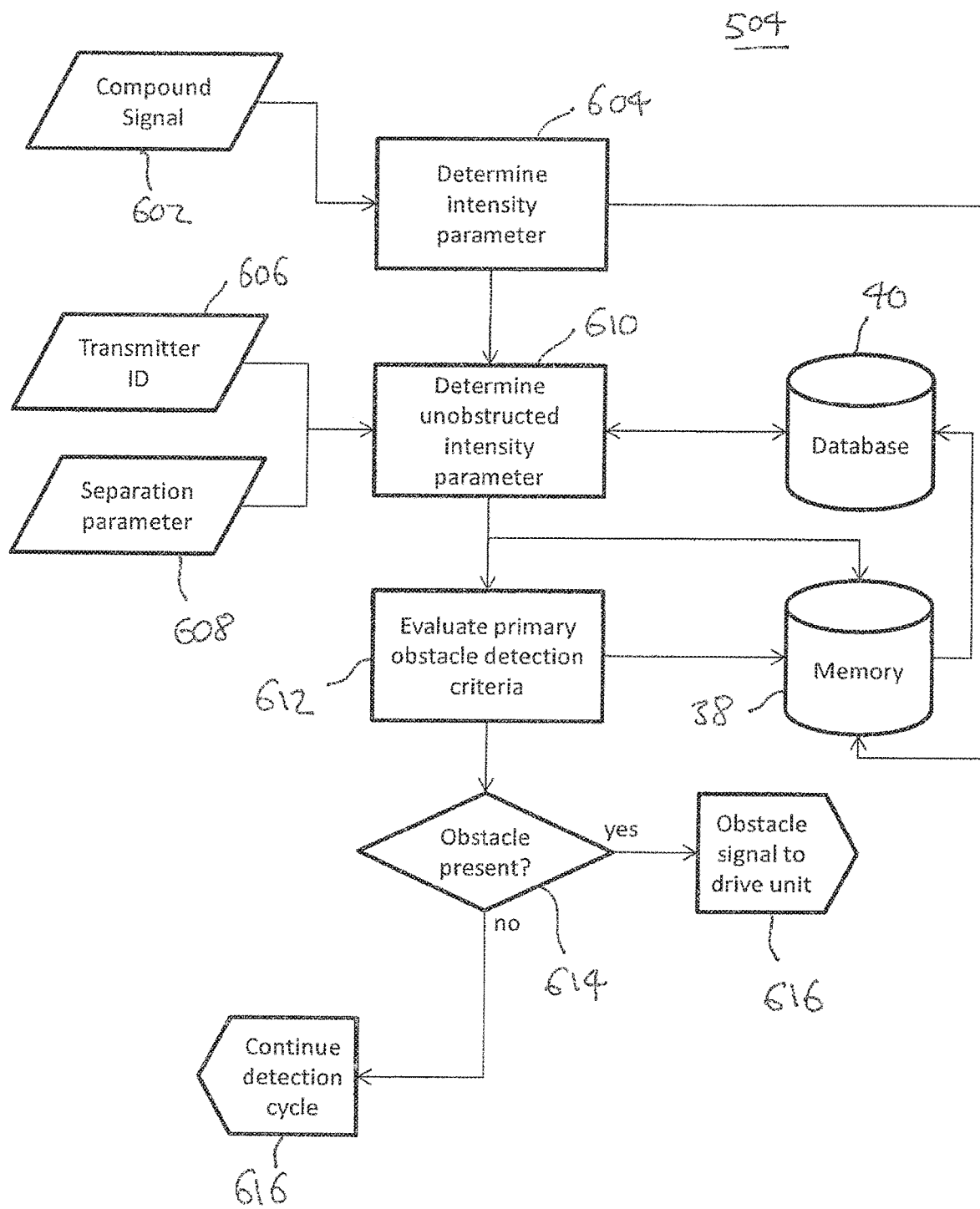
FIG. 6 illustrates the steps of evaluating the primary obstacle criteria.

As shown in FIG. 6, for each transmission the processor unit 26 receives the compound signal (602) and determines an intensity parameter from the signal relating to the amount of light received on the linked receivers (604). In this example, the compound signal is the digitised output of the 12-bit ADC and is proportional to the amount of infrared light received on the linked receivers 32.

The processor unit 26 determines the transmitter ID (606) associated with each respective portion of the compound signal, by reference to the time-division multiplexing of the transmitter controller 28. The processor unit 26 then determines the intensity parameter for each transmission as the average output of the ADC during the transmission period, and stores the intensity parameter in memory 38.

The processor unit 26 also determines the separation parameter relating to the lateral separation between the transmitter array 22 and the receiver array 24 by reference to the drive unit 42 (in particular, based on an output signal from the displacement sensor). The processor unit 26 determines an unobstructed intensity parameter for each respective transmission by querying the database 40, which holds unobstructed intensity parameters correlated by transmitter ID and separation parameter. In this embodiment, the unobstructed intensity parameter corresponds to the expected output of the ADC.

The unobstructed intensity parameters and intensity parameters for selected transmissions in this particular example are shown in Table 1, below. Transmitter ID 1 corresponds to the highest vertically in the array 24, and transmitter ID 37 corresponds to the lowest. Transmitter ID 20 is included to show the symmetrical arrangement of the receiver array about transmitter ID 19.

TABLE 1

| Transmitter ID | Unobstructed intensity parameter | Intensity parameter with receiver ID 19 blocked | Intensity parameter (ID 19 blocked, including noise) |
| --- | --- | --- | --- |
| 1 | 2607 | 2607 ± 3 | 2608 |
| 2 | 2813 | 2813 ± 3 | 2812 |
| 3 | 2815 | 2815 ± 3 | 2817 |
| 16 | 2815 | 2815 ± 3 | 2814 |
| 17 | 2815 | 2814 ± 3 | 2813 |
| 18 | 2815 | 2608 ± 3 | 2611 |
| 19 | 2815 | 414 ± 3 | 417 |
| 20 | 2815 | 2608 ± 3 | 2606 |

At a lateral spacing of 100 mm, the beam path 46 from each transmitter has a very limited axial extent (and therefore a limited vertical extent) such that light from an unobstructed beam is typically only received by between 3 and 5 receivers 32 of the receiver array 24. Further, the light intensity received by the receiver 32 lying on the beam axis 31 for an unobstructed transmission is significantly greater than the light intensity received at adjacent receivers owing to the significantly shorter path length for the receiver on the axis 31, and since the adjacent transmitters are inclined at relatively high angles to the beam axis. For example, the closest adjacent transmitter 32 is vertically separated by 50 mm, which translates to an angle of inclination with respect to the beam axis 31 of 26 degrees, and a path length of 111 mm rather than 100 mm.

As shown in Table 1, the unobstructed intensity parameter is lower for transmitter ID 1 because there is no receiver 32 immediately above the transmitter axis to receive the light in that area. However, owing to the short door gap of 100 mm, the unobstructed intensity parameter quickly settles to a steady value for transmitters towards the middle of the array 24.

If receiver ID 19 (only) is blocked, then the intensity parameter derived from the compound signal will substantially match the unobstructed intensity parameter for all those transmitters for which receiver ID 19 does not lie on the respective beam path. In this particular example, there is a background noise signal corresponding to approximately 3 increments of the ADC, and so the intensity parameter for transmissions from transmitter IDs 1, 2, 3 are 2607±3, 2813±3, 2814±3 respectively.

However, the intensity parameter for transmissions from transmitter IDs 18, 19, 20 are reduced relative the respective unobstructed intensity parameters, as shown in Table 1. Accordingly, it can be seen that approximately 85% of the light intensity is blocked when an obstacle lies on the beam axis 31 when there is a relatively small gap of 100 mm.

In this embodiment, the primary obstacle criteria is set so that an obstacle is determined to be present when the comparison between the intensity parameter and unobstructed intensity parameter is indicative of any reduction in light intensity on the linked receivers greater than a primary threshold reduction of 1%, provided that the reduction between the intensity parameter and the unobstructed intensity parameter is equal to or greater than a noise gap of 9 increments on the ADC. The noise gap of 9 increments represents a predetermined safety factor of 3 on the background noise signal, which itself corresponds to 3 increments on the compound signal. In other embodiments, the background noise signal may be determined to be higher or lower, or calculated differently, for example based on two standard deviations of a monitored noise parameter. Further, the safety factor for the noise gap may be adjusted based on monitored or absolute (e.g. stored) noise parameters relating to monitored noise levels or expected noise levels respectively.

For transmitter IDs 17, 18, 19, 20 the respective reductions are 2, 204, 2398 and 209 respectively, and correspond to reductions in light intensity of 0.07%, 7.2%, 85.2% and 7.4% respectively. This is greater than the primary threshold reduction for each of transmitter IDs 18, 19, 20, and the reduction also exceeds the "noise gap" of 9 increments. Accordingly, in this embodiment the processor unit 26 evaluates the primary obstacle criteria (612) to determine that an obstacle is present (614) based on each of the transmissions from transmitter IDs 18, 19, 20, in turn, and transmits obstacle signals (616) to the drive unit accordingly. In this embodiment, the drive unit is configured to prevent, or halt and reverse a door closing operation when at least one obstacle signal is received.

In a second obstacle detection example, the operational configuration of the automatic door installation corresponds to a door gap of 1500 mm, and receiver ID 19 (only) remains blocked by the same obstacle. The unobstructed intensity parameters and intensity parameters for selected transmissions are shown below in Table 2.

TABLE 2

| Transmitter ID | Unobstructed intensity parameter | Intensity parameter (receiver ID 19 blocked) | Intensity parameter (example with background noise) |
|---|---|---|---|
| 1  | 94  | 94 ± 3  | 86 |
| 2  | 104 | 104 ± 3 | 101 |
| 3  | 115 | 114 ± 3 | 117 |
| 16 | 174 | 165 ± 3 | 167 |
| 17 | 175 | 165 ± 3 | 164 |
| 18 | 175 | 165 ± 3 | 167 |
| 19 | 175 | 165 ± 3 | 165 |
| 20 | 175 | 165 ± 3 | 166 |

As shown in Table 2, no notable reduction is seen for transmitter IDs 1, 2 and 3. The reduction in the intensity parameter is relatively consistent for transmitter IDs 16-20 at between 9-10 increments ±3 on the ADC. The fourth column of Table 2 shows the example intensity parameters that may be determined from the compound signal as affected by the ±3 background noise signal.

Accordingly, in this example, receivers 16-20 demonstrate reductions in the intensity parameter relative the unobstructed intensity parameter of 7, 11, 8, 10 and 11 respectively. These correspond to percentage reductions in light intensity of 4%, 6.3%, 4.6%, 5.7% and 6.3% respectively, all of which are above the primary threshold reduction of 2%. However, the intensity parameters for transmitter IDs 16 and 18 are below the noise gap of 9 increments on the ADC.

Accordingly, in this example the processor unit 26 only determines the presence of an obstacle using the primary obstacle criteria based on the transmissions from transmitters 17, 19, 20 and 21. It will be appreciated that the processor unit 26 may also determine the presence of an obstacle based on other transmissions not shown in Table 2 that satisfy the primary obstacle criteria.

In a third obstacle detection example, the operational configuration of the automatic door installation corresponds to a door gap of 2000 mm (which is the maximum door gap in this embodiment), and receiver ID 19 (only) remains blocked. The unobstructed intensity parameters and intensity parameters for selected transmissions are shown below.

TABLE 3

| Transmitter ID | Unobstructed intensity parameter | Intensity parameter (receiver ID 19 blocked) | Intensity parameter (ID 19 blocked, including noise) |
|---|---|---|---|
| 1  | 69  | 69 ± 3  | 71 |
| 2  | 75  | 74 ± 3  | 77 |
| 3  | 81  | 80 ± 3  | 81 |
| 16 | 125 | 119 ± 3 | 119 |
| 17 | 126 | 120 ± 3 | 119 |
| 18 | 127 | 121 ± 3 | 119 |
| 19 | 127 | 121 ± 3 | 121 |
| 20 | 127 | 121 ± 3 | 122 |

As shown in Table 3, there is only a moderate reduction for transmitter IDs 1, 2, and 3 owing to the blocking of receiver 19. The reduction in the intensity parameter is consistent for transmitter IDs 16-20 at 6±3 increments. As previously, the fourth column of Table 3 shows the example intensity parameters that may be determined from the compound signal as affected by the ±3 background noise signal.

For transmissions 16-20, the processor unit 26 determines the respective reductions as 4.8%, 5.6%, 6.3%, 4.7% and 4% respectively. In addition, the processor unit 26 determines whether the reduction in light intensity is at least the noise gap of 9 increments for each transmission.

Accordingly, in this example, the processor unit 26 does not determine an obstacle to be present (614) based on any of the transmissions from transmitters IDs 16-20, and continues the detection cycle for subsequent transmissions of the cycle (616).

After completion of the detection cycle for all transmitter IDs 1-37 without determining the presence of an obstacle, the processor unit proceeds to determine whether an obstacle is present based on the secondary obstacle criteria (512). The secondary obstacle criteria is set so that an obstacle can be determined to be present if at least two transmissions (a first transmission and a second transmission) are indicative of the presence of an obstacle, as set out in detail below.

Figure 7:
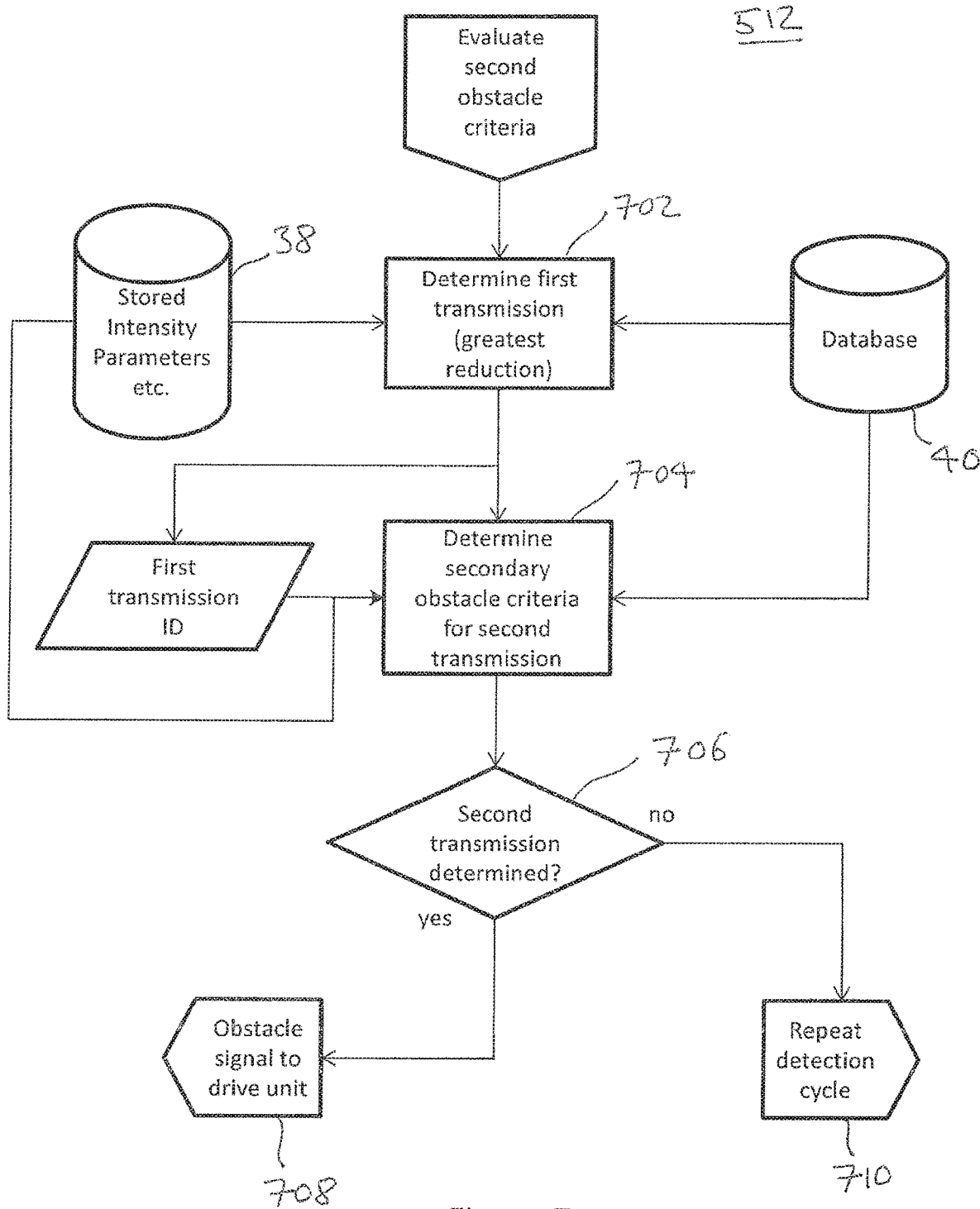
FIG. 7 illustrates the steps of evaluating the secondary obstacle criteria.

As shown in FIG. 7, the processor unit retrieves the intensity parameters stored in memory 38 for each transmission of the detection cycle and compares these with the respective unobstructed intensity parameters from the database 40 to determine which transmitter ID corresponds to the greatest reduction in light intensity received. In this example, the greatest reduction is determined to be that associated with transmission ID 18—a reduction of 8 increments or 6.3%. Although transmitter ID does not lie directly opposite the blocked receiver (receiver ID 19), and it may be expected that the transmission from transmitter ID 19 would manifest the greatest reduction, the intensity parameter for the transmission from transmitter ID 18 manifests the greatest reduction in this case due to the effect of the background noise signal. The background noise signal may have a proportionally larger influence on the compound signal at wide door gaps, when the light intensity received is relatively week in comparison to narrower door gaps owing to the inverse square relationship between path length and intensity.

The processor selects the transmission from transmitter ID 18 as a first transmission for use in the evaluation of the secondary obstacle criteria (702).

Having identified the first transmission as that corresponding to the greatest reduction in light intensity, the processor unit 26 determines the second obstacle criteria for selecting the second transmission based on the first transmission (704). This may be done in a number of different ways. In this embodiment, the secondary obstacle criteria for the second transmission is set on the assumption that the first transmission is blocked along the beam axis 31 (i.e. that the obstacle lies on the beam axis 31 for transmitter ID 18).

The database 40 includes lookup tables for each transmission (i.e. transmitter ID), at each door gap, specifying which transmissions (i.e. transmitter IDs) would be expected to result in reductions in light intensity at least half that of the reduction of the respective transmission along the beam axis 31 when the receiver 32 on the beam axis is blocked. Accordingly, having identified transmitter ID 18 as the first transmission, the processor unit 26 looks up the appropriate lookup table for transmitter ID 18 at the relevant door gap (2000 mm), and consequently determines that transmitter IDs 6-29 can be expected to have a reduced light intensity compared to an unobstructed transmission when an obstacle lies on the beam axis 31 for transmitter ID 18. In particular, if receiver 18 is blocked (only), a reduction in light intensity (ignoring background noise) of 4.7% would be expected for a transmission from transmitter ID 18. Transmissions from any of transmitter IDs 6-29 would be expected to result in reductions in light intensity of at least 2.35% (i.e. 50% of the reduction for the first transmission). The processor unit 26 therefore determines which transmissions to evaluate the secondary obstacle criteria for, based on this lookup.

The processor unit 26 determines whether the intensity parameters for each of the transmissions in turn from transmitter IDs 6-29 is reduced relative the respective unobstructed intensity parameters by the secondary threshold reduction, and whether they differ by the required noise gap. In this embodiment, the secondary threshold reduction is set as 0.5%, and the noise gap is set as twice the background noise signal (i.e. 6 increments on the ADC output).

Accordingly, in this embodiment, the processor unit identifies that a plurality of transmissions meet these criteria (706), including each of transmitter IDs 16-19 shown above, but not transmitter ID 20.

Accordingly, the processor unit 26 determines that an obstacle is present and transmits an obstacle signal to the drive unit 42 (708). If no second transmission meeting the secondary evaluation criteria is determined, the detection cycle 500 repeats (710).

It will be appreciated that for some shorter door gap sizes, the lookup table may indicate that no other transmissions can be expected to result in a reduction in light intensity of at least 50% of the reduction in light intensity for a first transmission. For example, when the door gap is only 100 mm, 85% of the light received by the receivers 32 is received by the receiver along the beam axis 31 from the transmitter, and so no transmissions from adjacent transmitters will result in a reduction of at least 42.5% if only the one receiver is blocked. Accordingly, the specific secondary obstacle criteria described above cannot be evaluated for such transmissions. Nevertheless, owing to the short door gap, the intensity of light received in an unobstructed transmission will be so high that any minor obstacle along the beam path will result in a readily-detectable reduction in light intensity based on the primary obstacle criteria.

In other embodiments, the processor unit 26 may simply select the second transmission by determining if any other transmissions in the detection cycle are indicative of a reduction over the secondary reduction threshold and at least the noise gap of 5 increments.

Figure 8:
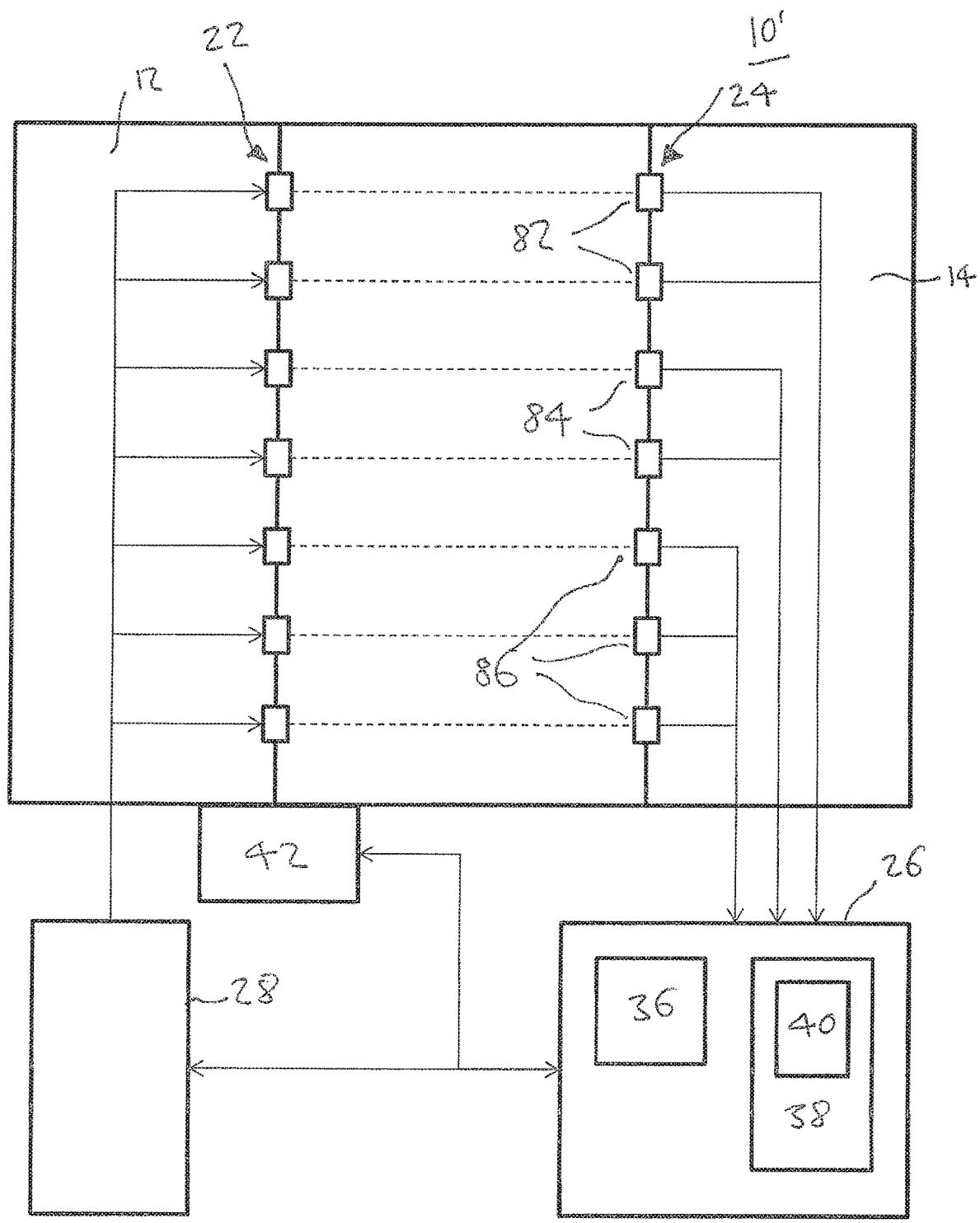
FIG. 8 illustrates a further automatic door installation comprising a plurality of sets of receivers.

In a further automatic door installation 10' shown in FIG. 8, the receiver array 24 comprises three sets of receivers (in other embodiments, there may be more than three sets). Each set comprises a plurality of receivers 32 linked without multiplexing, as described above.

In the example described above, the primary and secondary obstacle criteria are set based on a comparison between an unobstructed intensity parameter and an (observed) intensity parameter, and a minimum noise gap. The noise gap represents a threshold over which a reduction in the observed intensity can be reliably attributed to a reduction in light rather than a level of noise affecting the signal.

It will be appreciated that a variety of signal processing methods may be employed to evaluate the primary and secondary obstacle criteria. For example, the detection cycle may involve three transmissions from each transmitter ID in turn (i.e. three transmissions from transmitter ID 1, followed by three transmissions from transmitter ID 2, etc.), and the processor unit 26 may sample the receiver output signal over the three successive transmissions for each transmitter ID to obtain an intensity parameter representing an average of the three transmissions. For example, the three transmissions may correspond to 15 cycles of a carrier frequency each.

Further, in the above example the processor unit 26 obtains unobstructed intensity parameters based on a direct lookup from the database, whereas in other examples the processor unit 26 may interpolate an unobstructed intensity parameter based on one or more factors, such as the door gap. In yet further examples, an unobstructed intensity parameter may be derived by extrapolating a previously measured value (for instance, from an earlier point in a door closing operation) and adjusting the previously measured value according to an expected change. For example, the processor unit 25 may adjust a previously measured value for a door gap of 1.8 m for a current door gap of 1.6 m by extrapolating the previously measured value based on a known, expected, or previously observed/recorded trend.

The comparison of the average intensity parameter with the unobstructed intensity parameter results in a difference value or delta value. The processor unit 26 compares the delta value with a noise parameter or noise gap to determine whether it is significant. For example, a noise parameter or noise gap may be derived based on a database comprising noise parameters correlating to expected or observed levels of noise at different door gaps. Further, the noise parameters may be determined or adjusted based on other data available to the processor unit 124, such as a metric of the noise affecting the automatic door installation.

The unobstructed intensity parameters may be predetermined or may be determined based on observed data and updated during operation of the automatic door installation. For example, the processor unit 26 may periodically determine a long-term average for intensity parameters at respective door positions (door gaps), for example over a period of between 30 seconds and 3 minutes, at intervals of 20 minutes. The processor unit 26 may analyse a long-term trend of an intensity parameter, and update an unobstructed intensity parameter accordingly (provided that no obstacles were determined to be present during the respective periods. Accordingly, the unobstructed intensity parameters may be updated to accommodate a long-term change (or "drift") in the light intensity emitted or received from the transmitters and receivers respectively. In particular, the processor unit 24 may determine long-term averages for intensity parameters when the doors are closed (as no obstacle may be determined to be present), and thereby track any underlying change in the performance of the transmitters and receivers (such as a gradual reduction in the light intensity output by the transmitters).

In the above described embodiment, the linked receivers are arranged adjacent one another, although in other embodiments the linked receivers may be spaced apart from each other. Providing a plurality of sets 82, 84, 86 of receivers means that the proportion of light on the linked receivers that is not received when a receiver is blocked, relative an unobstructed transmission, is increased. This may make it easier to reliably determine when a receiver is blocked based on the respective compound signal for the set. Each set of linked receivers produces a respective compound signal which are received by the processor on different channels. In other words, the sets are multiplexed so that the respective compound signals can be distinguished from one another, although the receivers within each set are not multiplexed with respect to each other.

Figure 9:
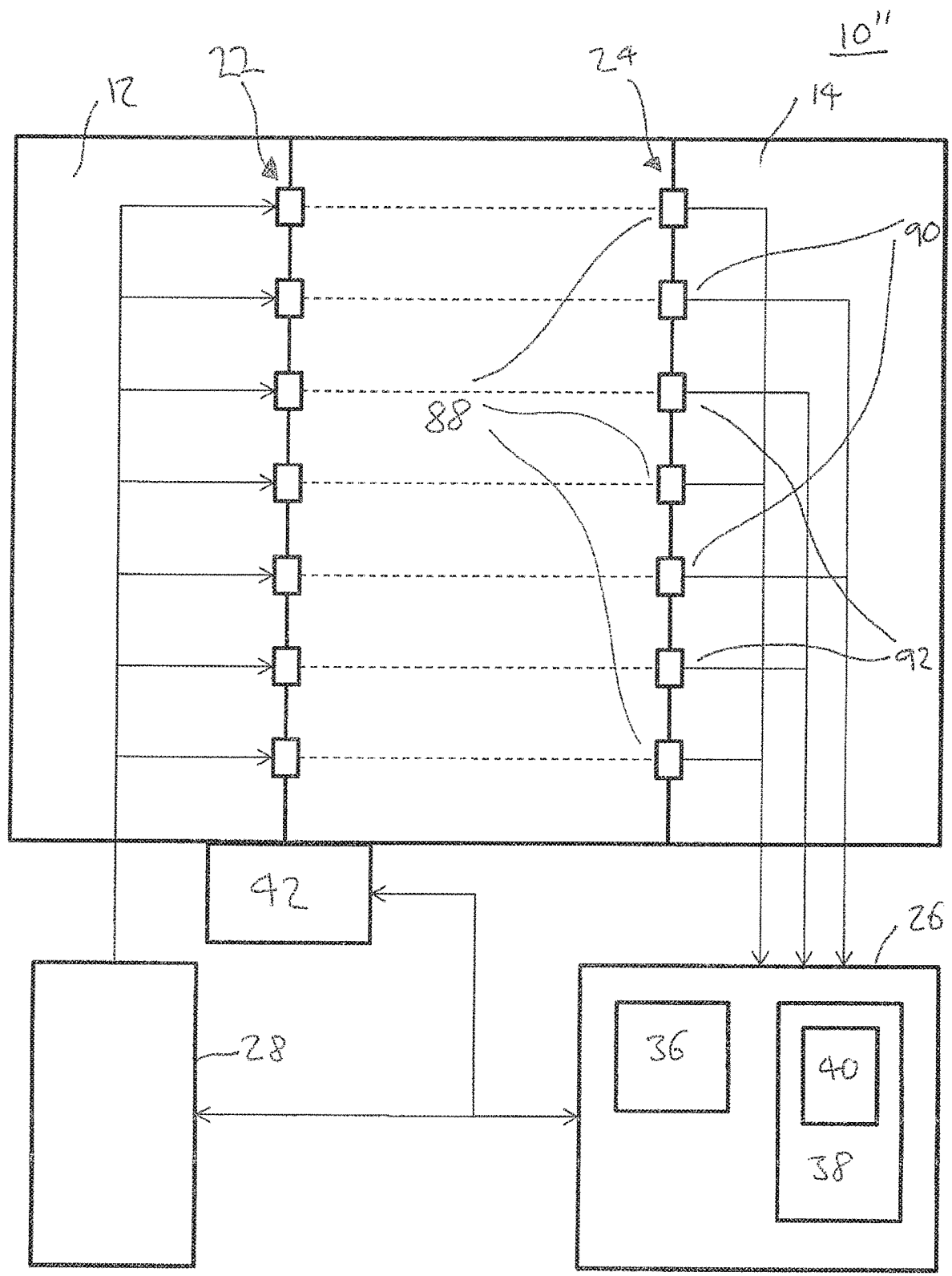
FIG. 9 illustrates an alternative automatic door installation comprising a plurality of sets of receivers.

In a further automatic door installation 10" shown in FIG. 9, there are three sets 88, 90, 92 and the receiver array 24 comprises an alternating arrangement, so that three adjacent receivers are associated with different sets. In other words, the receivers from different sets are interposed with each other, such that every third receiver belongs to the same set.

The above described methods of determining the presence of an obstacle apply equally to the embodiments shown in FIGS. 8 and 9.

Although embodiments of the invention have been described in which the transmitter controller is separate from the processor unit, in other embodiments the transmitter controller could be integral with the processor unit.

Although embodiments of the invention have been described in which a obstacle signal received by the drive unit prevents, stops or reverses a door closing operation, it will be appreciated that in other embodiments, multiple obstacle signals may be required before a door operation is prevented, stopped or reverses. For example, obstacle signals from two consecutive detection cycles may be required.

In the above description, features shown in the drawings of the apparatus are provided with reference numerals without brackets, whereas method steps shown in the drawings are provided with reference numerals in brackets.

Although embodiments of the invention have been described in which the primary threshold reduction and secondary threshold reduction correspond to a smaller reduction than would occur if a receiver is entirely blocked, in other embodiments the primary threshold reduction and secondary threshold reduction may be set based on the expected loss of light intensity when a receiver is entirely blocked.

Although embodiments of the invention have been described in which there is a variable gain amplifier for controlling system gain (i.e. the intensity of the receiver output signal), it will be appreciated that other variables may be controlled to affect system gain, such as the power supplied to the transmitter.

The invention claimed is:

1. An automatic door installation comprising:
  a door opening; and
  an optical door sensor comprising:
  a plurality of transmitters arranged in a transmitter array, each transmitter being configured to transmit an optical beam across the door opening along a respective beam path;
  a plurality of receivers arranged in a receiver array, each receiver being configured to generate a receiver output signal based on an intensity of light received, the plurality of receivers being coupled to the processor unit via a non-spatially resolving common link without multiplexing;
  wherein the plurality of receivers are arranged in at least one set of receivers, the receivers being linked so that the respective sensor output signals are combined into a compound signal for the respective set relating to cumulative light intensity received on a plurality of receivers; and
  a processor unit configured to receive the compound signal from the at least one set of receivers;
  wherein each transmitter is arranged so that at least two receivers belonging to the same set of receivers lie on the respective beam path in at least one operational configuration of the automatic door installation; and
  wherein the processor unit is configured to determine whether an obstacle is present based on the at least one compound signal.

2. An automatic door installation according to claim 1, wherein the transmitter array is a linear array having a linear extent of approximately 0.5 m to approximately 2.5 m.

3. An automatic door installation according to claim 1, further comprising a transmitter controller configured to control the transmitters to transmit the respective optical beams by time-division multiplexing and/or frequency-division multiplexing so that the respective optical beams are discrete from one another.

4. An automatic door installation according to claim 1, wherein for each transmission of an optical beam, the processor unit is configured to:
  determine an intensity parameter from the respective compound signal relating to the light intensity on the respective linked receivers;
  determine whether an obstacle is present in the door gap based on the intensity parameter and primary obstacle criteria;
  wherein the primary obstacle criteria is set based on an unobstructed intensity parameter relating to an unobstructed transmission of the respective optical beam, so that an obstacle is determined to be present when the intensity parameter is indicative of any reduction of light intensity on the linked receivers greater than a primary threshold reduction, wherein the primary threshold reduction is between 0.2% and 60% relative an unobstructed transmission.

5. An automatic door installation according to claim 4, further comprising a database of unobstructed intensity parameters correlated by at least one operational parameter of the automatic door installation, and wherein the processor unit is configured to lookup the unobstructed intensity parameter for determining whether an obstacle is present based on at least one operational parameter.

6. An automatic door installation according to claim 5, wherein the at least one operational parameter is selected from the group consisting of:
  a transmitter parameter for identifying the transmitter which corresponds to the respective transmission of the optical beam;
  a separation parameter relating to the lateral separation between the transmitter array and the receiver array;
  a channel parameter for identifying the set of receivers which corresponds to the respective compound signal;
  a noise parameter relating to a background noise signal affecting the optical door sensor.

7. An automatic door installation according to claim 5, wherein the processor unit is configured to update the database of unobstructed intensity parameters based on an intensity parameter observed in use when an obstacle is not determined to be present.

8. An automatic door installation according to claim 1, wherein the transmitter array and the receiver array oppose one another across the door gap, and wherein at least one of the transmitter array and receiver array is mounted to a moveable part of the door installation such that the transmitter array and the receiver array draw closer together during a door closing operation.

9. An automatic door installation according to claim 8, wherein for each transmission of an optical beam, the processor unit is configured to:
  determine an intensity parameter from the respective compound signal relating to the light intensity on the respective linked receivers;
  determine whether an obstacle is present in the door gap based on the intensity parameter and primary obstacle criteria;
  wherein the primary obstacle criteria is set based on an unobstructed intensity parameter relating to an unobstructed transmission of the respective optical beam, so that an obstacle is determined to be present when the intensity parameter is indicative of any reduction of light intensity on the linked receivers greater than a primary threshold reduction, wherein the primary threshold reduction is between 0.2% and 60% relative an unobstructed transmission; and wherein the unobstructed intensity parameter is dependent on a separation parameter relating to the lateral separation between the transmitter array and the receiver array in a respective operational configuration of the automatic door installation.

10. An automatic door installation according to claim 9, wherein the automatic door installation comprises a door controller configured to monitor or predict the operational configuration of the door installation, wherein the processor unit is coupled to the door controller so as to determine the separation parameter.

11. An automatic door installation according to claim 1, wherein the processor unit is configured to determine the presence of an obstacle based on at least two compound signals corresponding to transmissions from different transmitters and secondary obstacle criteria.

12. An automatic door installation according to claim 11, wherein for each transmission of an optical beam, the processor unit is configured to:
  determine an intensity parameter from the respective compound signal relating to the light intensity on the respective linked receivers;
  determine whether an obstacle is present in the door gap based on the intensity parameter and primary obstacle criteria;
  wherein the primary obstacle criteria is set based on an unobstructed intensity parameter relating to an unobstructed transmission of the respective optical beam, so that an obstacle is determined to be present when the intensity parameter is indicative of any reduction of light intensity on the linked receivers greater than a primary threshold reduction, wherein the primary threshold reduction is between 0.2% and 60% relative an unobstructed transmission; and
  wherein the processor unit is configured to determine the presence of an obstacle based on at least two intensity parameters corresponding to transmissions from different transmitters;
  wherein the secondary obstacle criteria is set based on the respective unobstructed intensity parameters, so that an obstacle is determined to be present when each of the respective intensity parameters are indicative of any reduction of light intensity on the respective linked receivers greater than a respective secondary threshold reduction, wherein the secondary threshold reduction is less than the primary threshold reduction for the respective transmission and respective compound signal.

13. An automatic door installation according to claim 12, wherein the transmitter controller is configured to cause each transmitter of the transmitter array to transmit a respective optical beam in a detection cycle; and
  wherein the processor unit is configured to:
  determine whether an obstacle is present based on the intensity parameter and primary obstacle criteria for each transmission; and
  determine whether an obstacle is present based on the intensity parameters for at least two respective transmissions and the respective secondary obstacle criteria when no obstacle is determined to be present based on primary obstacle criteria for any of the transmissions in the detection cycle.

14. An automatic door installation according to claim 13, wherein the processor unit is configured to:
  determine a first transmission of the detection cycle for which the intensity parameter is indicative of a reduction in light greater than the respective secondary threshold reduction and less than the primary threshold reduction;
  determine a second transmission of the detection cycle based on the first transmission;
  determine whether an obstacle is present based on the intensity parameters for the first and second transmissions and the respective secondary obstacle criteria.

15. An automatic door installation according to claim 14, wherein the processor unit is configured to determine the first transmission by identifying which transmission of the detection cycle is associated with an intensity parameter indicative of the greatest reduction in light received relative an unobstructed transmission in the detection cycle.

16. An automatic door installation according to claim 15, further comprising a secondary obstacle criteria database comprising secondary obstacle criteria for the first and second transmissions; and
  wherein the processor unit is configured to determine the secondary obstacle criteria for the second transmission based on the first transmission and the second transmission.

17. The automatic door installation according to claim 1, wherein the optical beam is infrared.

18. A method of determining the presence of an obstacle in a door gap of an automatic door installation, the automatic door installation comprising:
  the door opening; and
  an optical door sensor comprising:
  a plurality of transmitters arranged in a transmitter array, each transmitter being configured to transmit an optical beam across the door opening along a respective beam path;
  a plurality of receivers arranged in a receiver array, each receiver being configured to generate a receiver output signal based on an intensity of light received, the plurality of receivers being coupled to the processor unit via a common link without switching or multiplexing;
  wherein the plurality of receivers are arranged in at least one set of the receivers, the receivers being linked so that the respective sensor output signals are combined into a compound signal for the respective set relating to cumulative light intensity received on the plurality of receivers; and
  wherein each transmitter is arranged so that at least two receivers belonging to the same set of receivers lie on the respective beam path in at least one operational configuration of the automatic door installation;
  the method comprising:
  causing the transmitters to transmit respective optical beams across the door opening so that the receivers generate corresponding receiver output signals and the compound signal;
  determining the presence of an obstacle in the door gap based on the at least one compound signal.

19. A method according to claim 18, further comprising, for each transmission of an optical beam:
  determining an intensity parameter from the respective compound signal relating to the light intensity on the respective linked receivers;
  wherein the presence of an obstacle is determined based on the intensity parameter and primary obstacle criteria;
  wherein the primary obstacle criteria is set based on an unobstructed intensity parameter relating to an unobstructed transmission of the respective optical beam, so that an obstacle is determined to be present when the intensity parameter is indicative of any reduction of light intensity on the linked receivers greater than a primary threshold reduction, wherein the primary threshold reduction is between 0.2% and 60% relative an unobstructed transmission.

20. A method according to claim 18, wherein the presence of an obstacle is determined based on at least two compound signals corresponding to transmissions from different transmitters and secondary obstacle criteria.

21. A method according to claim 20, wherein each transmitter of the transmitter array transmits a respective optical beam in a detection cycle, the method comprising:
- determining whether an obstacle is present based on the intensity parameter and primary obstacle criteria for each transmission; and
- determining whether an obstacle is present based on the intensity parameters for at least two respective transmissions and the respective secondary obstacle criteria when no obstacle is determined to be present based on primary obstacle criteria for any of the transmissions in the detection cycle.

22. The method according to claim 18, wherein each optical beam is infrared.

* * * * *